Nov. 14, 1961 G. F. SCHROEDER 3,008,348
SQUARING UNIT
Filed Dec. 15, 1958 6 Sheets-Sheet 1

INVENTOR
GEORGE F. SCHROEDER
BY
Victor D. Borst
ATTORNEY

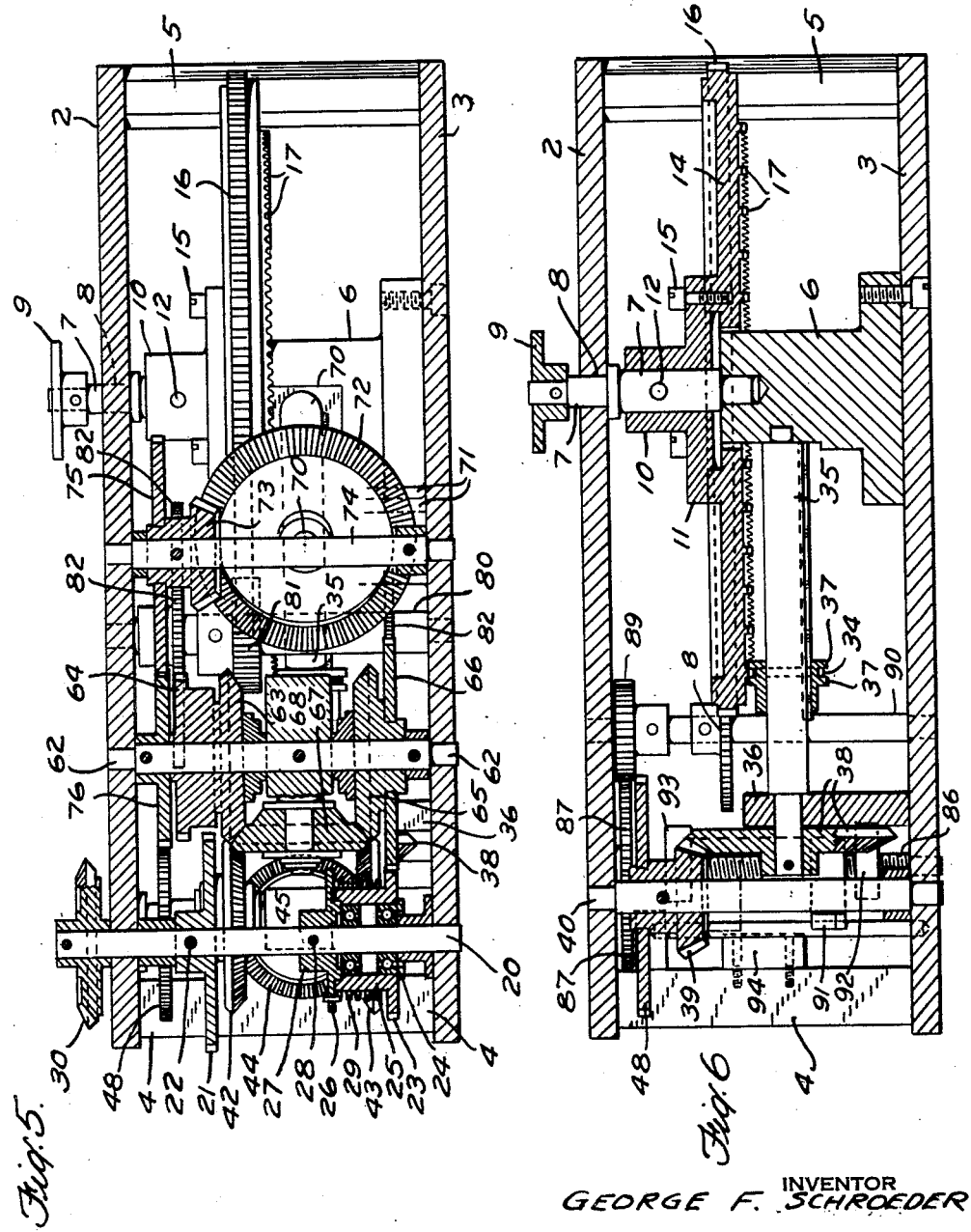

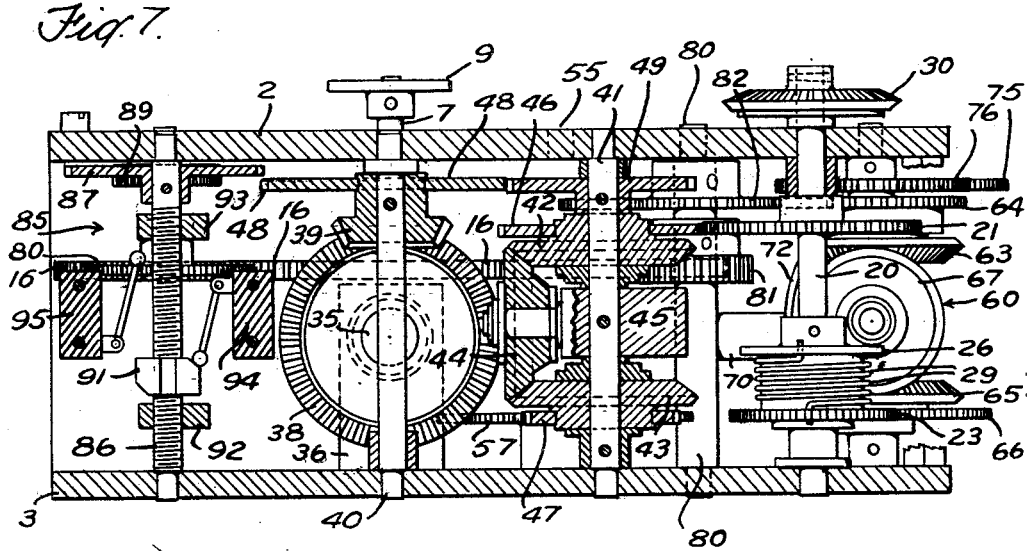

Nov. 14, 1961  G. F. SCHROEDER  3,008,348
SQUARING UNIT

Filed Dec. 15, 1958  6 Sheets-Sheet 5

INVENTOR
GEORGE F. SCHROEDER
BY
Victor D. Borst
ATTORNEY

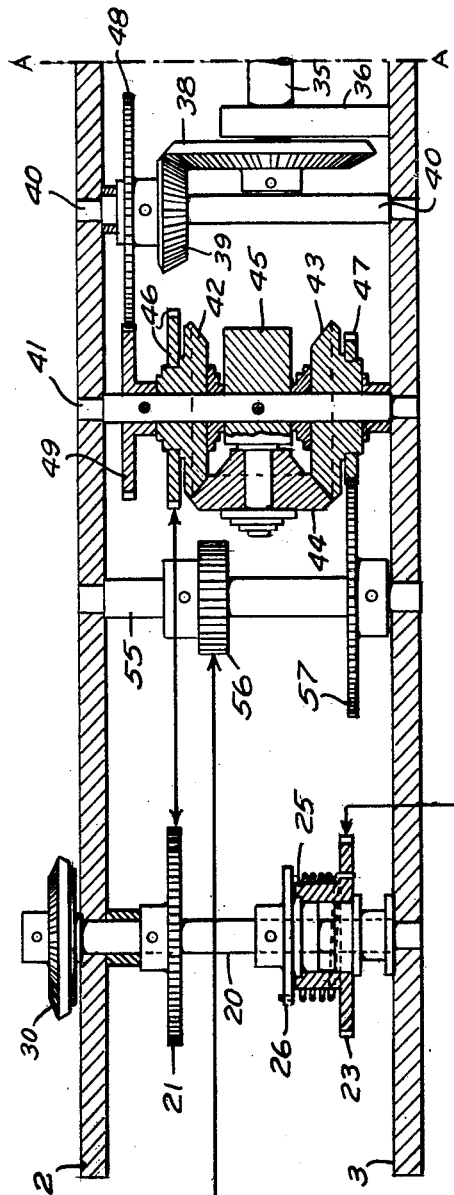
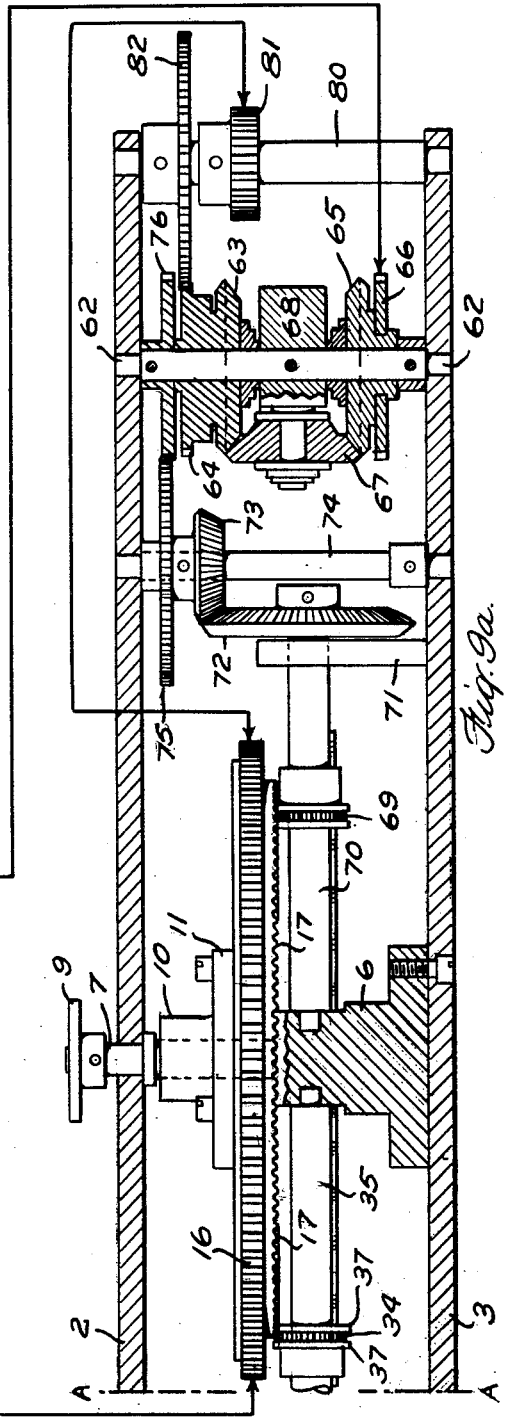

United States Patent Office 3,008,348
Patented Nov. 14, 1961

3,008,348
SQUARING UNIT
George F. Schroeder, Pines Lake, N.J., assignor to Sperry Rand Corporation, Long Island, N.Y., a corporation of Delaware
Filed Dec. 15, 1958, Ser. No. 780,282
18 Claims. (Cl. 74—674)

This invention relates generally to mechanical computers which are used for computing various types of control data from a combination of different variables imparted thereto. More specifically the invention relates to squaring units which are a component part of such mechanical computers, and this application is a continuation-in-part of my copending application Serial No. 649,457, filed March 29, 1957, now abandoned.

Squaring units of the type with which this invention is concerned comprise generally a gear member which is adapted to be rotated in accordance with an input imparted thereto. The gear member consists of a flat circular disk having a spur gear on the periphery thereof, and a uniform spiral gear on the flat face thereof which spiral of teeth extends inwardly from adjacent the periphery thereof and for manufacturing reasons terminates a short distance outwardly from the center of the disk. A small pinion which meshes with the spiral gear is adapted to be rotated thereby and to move radially inwardly and outwardly across the face of the disk as the gear member is rotated in one direction or the other by the input means. The output of the pinion is essentially equal to the square of the input to the gear member. This then has the effect of squaring the radial distance outwardly from the center of the gear member to the inner end of the spiral gear which may be designated "$a$" and is a function of the number of rotations imparted to the gear member by the input means, plus the distance from the inner end of the spiral to the pinion which may be designated "$X$" and is a further function of the number of turns imparted to the gear member. The equation for the output of the pinion is therefore $(X+a)^2 = X^2 + 2aX + a^2$. The $a^2$ value is a constant offset of no concern but the linear value $2aX$ must be eliminated by a differential by which it is subtracted from the output of the pinion. The output of the pinion is delivered through an output shaft which is connected to the pinion by a gear train in which the differential is interposed.

It has been found that due to necessary manufacturing tolerances and wear due to use there is a certain amount of back lash and lost motion in the gear train between the input means and the output shaft which affects the accuracy of the output of the unit. Since the output is as the square of the input this error in the output drastically increases as the value of X approaches zero. In order to eliminate this back lash and lost motion I provide a second pinion which meshes with the spiral gear and is similar to the first pinion; and I connect this second pinion to the output shaft by a second gear train and differential which are similar to the gear train and differential connecting the first pinion to the output shaft. The final gear in the gear train connecting the first pinion to the output shaft is keyed or pinned to the output shaft; and the final gear in the gear train connecting the second pinion to the output shaft is rotatably mounted upon the output shaft and is connected to the output shaft by a pre-loaded coiled spring which is disposed about the output shaft between the first and second final gears with one end thereof connected to the final gear of the second gear train and the other end thereof connected to the output shaft.

The principal object of the invention is to provide a new and improved squaring unit, for mechanical computers, which is of relatively simple construction, more compact, and more accurate in operation than previously known devices of this character.

Another object of the invention is to provide in squaring of the aforesaid character means by which computing errors, due to manufacturing tolerances and wear during use, are eliminated.

Having stated the principal objects of the invention other and more limited objects of the invention will be apparent from the following specification and the accompanying drawings forming a part thereof in which:

FIG. 5 is a vertical sectional view taken on the line 5—5 on FIGS. 1 and 4;

FIG. 6 is a vertical sectional view taken on the line 6—6 on FIGS. 1 and 4;

FIG. 7 is a vertical sectional view taken on the line 7—7 on FIGS. 1 and 4;

FIGS. 9 and 9a joined together at the line A—A constitute a shaft diagram in which the various parts of the squaring unit are shown in the same plane with the various meshing gears connected together by lead lines; and FIGS. 10, 11 and 12 are diagrammatic views illustrating the general principle utilized in eliminating back lash and lost motion.

Figure 1:
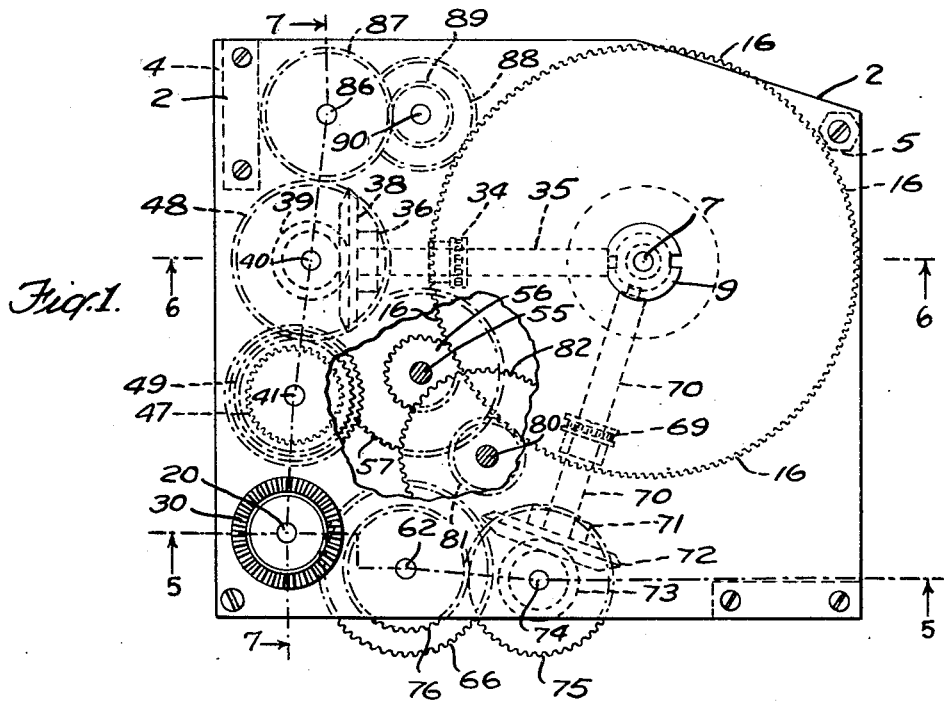
FIG. 1 is a plan view, partially broken away, of a mechanical computer squaring unit constructed according to my invention.
Figure 2:
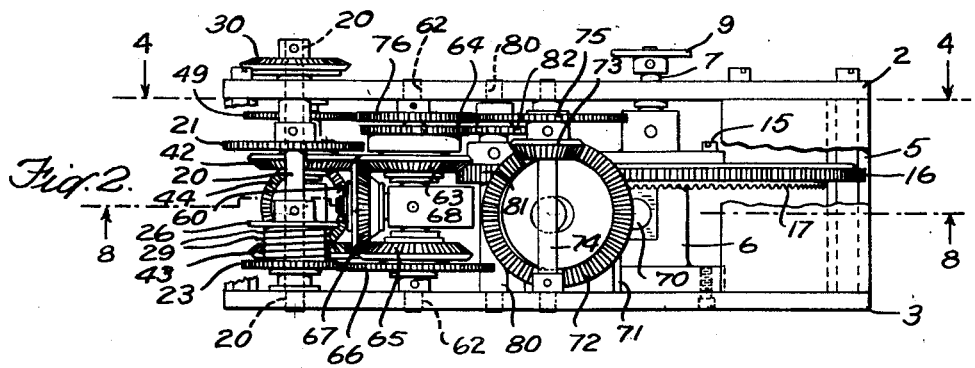
FIG. 2 is a front elevation of the squaring unit shown in FIG. 1.
Figure 3:
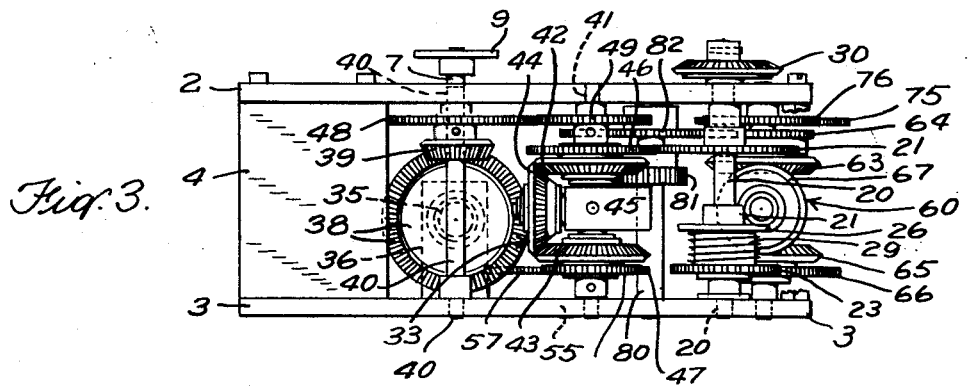
FIG. 3 is a side elevation thereof looking from the left of FIG. 1.
Figure 4:
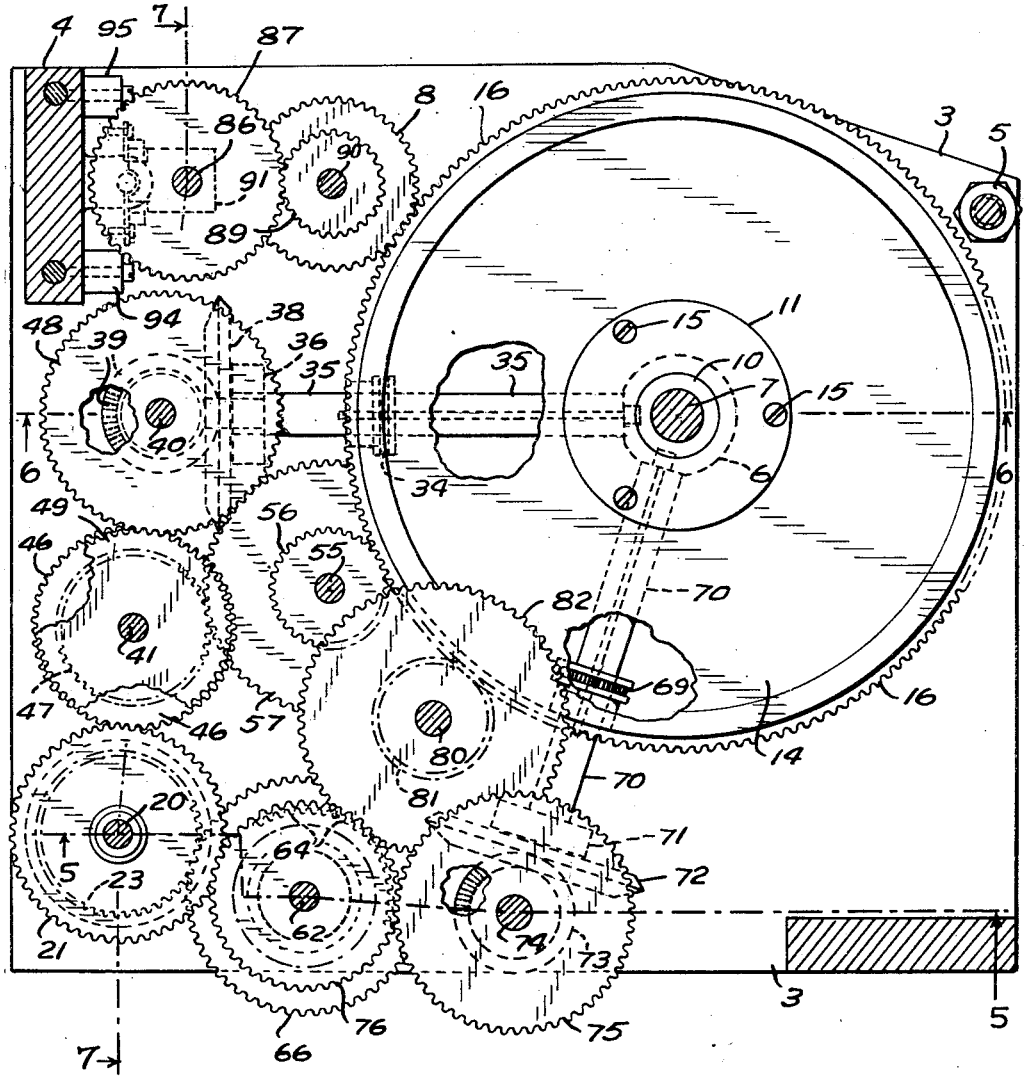
FIG. 4 is a horizontal section taken on the line 4—4 on FIG. 2.
Figure 8:
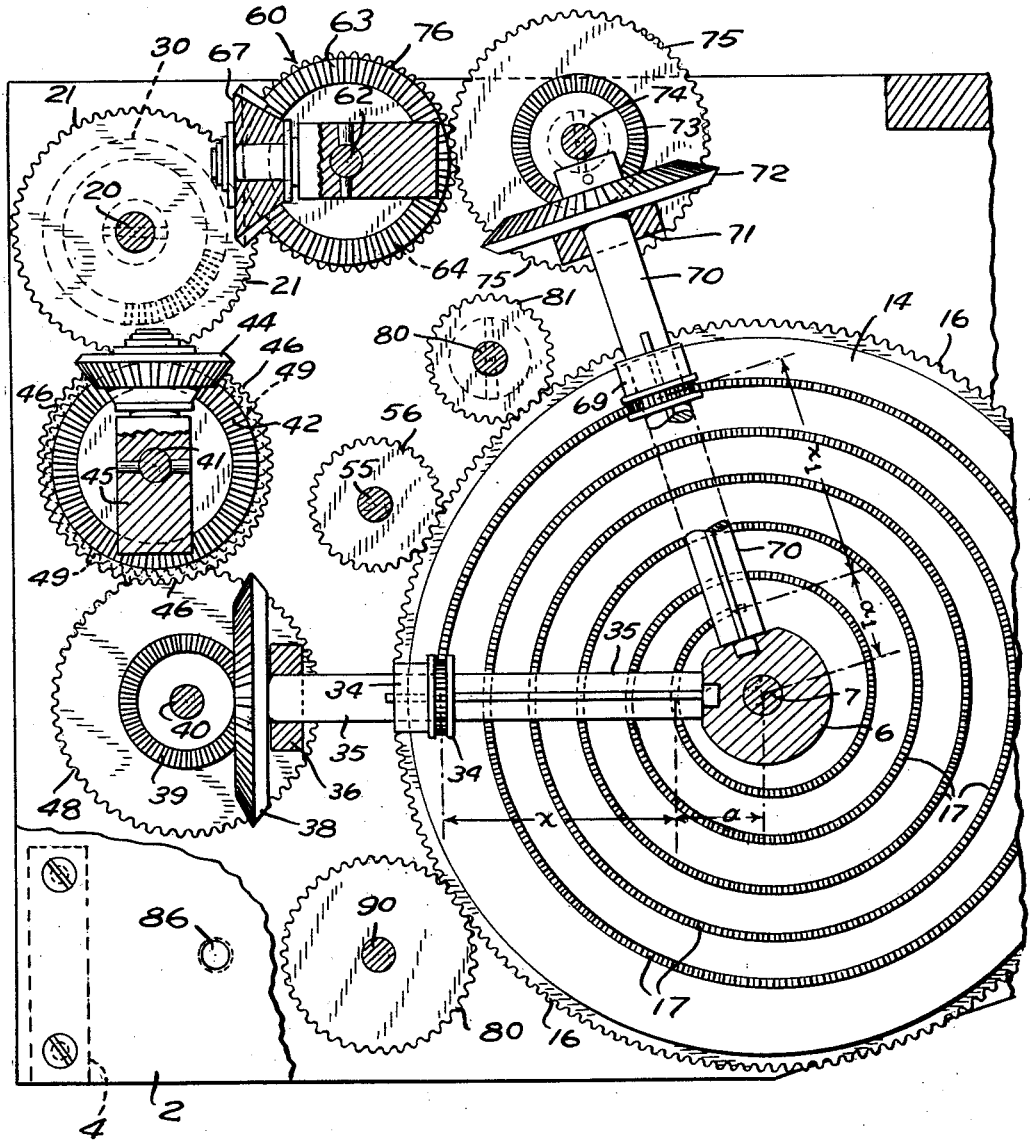
FIG. 8 is a horizontal section taken on the line 8—8 on FIG. 2.

Referring now to the drawings by reference characters the numeral 1 indicates a squaring unit having a frame which comprises the upper and lower plates 2 and 3 by and between which the various shafts of the squaring unit are supported. The plates 2 and 3 are secured together in fixed relation by the connecting blocks 4 and the tie-rods 5. The lower plate 3 has an upwardly extending bearing post 6 secured thereto in which the lower end of an input shaft 7 is rotatably mounted. The shaft 7 extends up through an aperture 8 in the upper plate 2 and has a disk 9 secured to the upper end thereof through which an input mechanism is connected to the input shaft 7. A collar 10 having an annular integral flange 11 around the lower end thereof is pinned to the shaft 7, as indicated at 12, between the post 6 and the plate 2. A gear disk or member 14 which is secured to the under side of the flange 11 by screws 15 is provided around the periphery thereof with a spur gear 16 and on the lower face thereof with a spiral gear 17 which spirals inwardly from adjacent periphery of the disk 14, and terminates some distance outwardly from the center of the disk as is shown in FIG. 8.

An output shaft 20 is rotatably supported by and between the plates 2 and 3 with the upper end thereof extending up beyond the upper plate 2. A spur gear 21 is pinned on the shaft 20 adjacent the upper plate 2, as shown at 22, and a take-off gear 30 is secured to the upper end thereof through which the output of the shaft 20 is imparted to other elements of the computer in which the squaring unit is mounted.

The output shaft 20 is driven by the gear member 14 through the spiral gear 17 and a differential 33 by a gear train 31 which comprises a small pinion gear 34 which meshes with the spiral gear 17, and is slidably splined on a shaft 35 for radial inward and outward movement in mesh with the spiral gear 17 as the gear member 14 is rotated in one direction or the other by the input means. The rotation of the gear member 14 is always in accordance with the input value. The input value may be a positive value in which case the gear member 14 will be rotated in one direction or it may be a negative value in which case the gear member 14 will be rotated in the opposite direction and the rate of input may vary during input. One end of the shaft 35 is rotatably supported by the bearing post 6 and the other end thereof is rotatably mounted in a bearing bracket 36 which is secured to the lower plate 3 and extends upwardly therefrom. The pinion 34 is provided with a pair of annular flanges 37, one on each side thereof, which straddle the spiral gear 17, and thereby assure the radial movement of the pinion 34 in mesh with the spiral gear 17. The shaft 35 has a bevel gear 38 secured to the outer end thereof, adjacent the bracket 36, which meshes with a bevel gear 39 secured on an idler shaft 40 which is rotatably mounted between the upper and lower plates 2 and 3.

The differential 33 which is interposed between the idler shaft 40 and the output shaft 20 comprises the spider shaft 41 which is rotatably supported between the plates 2 and 3, the upper and lower bevel gears 42 and 43 which are rotatably mounted in opposed spaced relation upon the spider shaft 41, and the connecting bevel gear 44 which meshes with the upper and lower bevel gears 42 and 43 and is rotatably mounted upon the spider 45 which is pinned to the spider shaft 41 between the gears 42 and 43. The upper bevel gear 42 has a spur gear 46 rigidly secured thereto for rotation therewith which meshes with the gear 21 pinned on the output shaft 20, and the lower bevel gear 43 has a spur gear 47 secured thereto for rotation therewith.

The bevel gear 39 secured on the idler shaft 40 has a spur gear 48 secured thereto which meshes with a bevel gear 49 which is secured on the spider shaft 41 adjacent the upper bevel gear 42. From this it will be seen that the output shaft 20 is driven by the gear member 14 through the spiral gear 17, pinion gear 34, shaft 35, the meshing bevel gears 38 and 39, the meshing spur gears 48 and 49, and the differential 33 through the meshing spur gears 46 and 21 secured to the differential 33 and output shaft 20 respectively.

The spiral gear 17 and the pinion gear 34 are so proportioned and arranged that the output of the pinion gear 34 is essentially equal to the square of the input to the gear member 14 for any position of the pinion gear 34 on the spiral gear 17. This has the effect of squaring the distance radially outwardly from the center of the gear member 14 to the inner end of the spiral gear 17, which is a constant and a function of the input to the cam 14 and is designated "$a$" on FIG. 8, plus the distance radially outwardly from the inner end of the spiral gear 17 and the pinion gear 34, which is a variable and a further function of the input to the gear member 14 and is designated "$X$" on FIG. 8. The equation for the output of the pinion 34 is therefore $(X+a)^2 = X^2 + 2aX + a^2$. The $a^2$ value being a constant offset can be disregarded, but the linear value $2aX$ must be subtracted from the output of the pinion 34 by the differential 33. For this purpose a rotatably mounted shaft 55 is interposed between the spur gear 16 of the gear member 14 and the differential 33. A pair of vertically spaced spur gears 56 and 57 are pinned on the shaft 55 with the gear 56 in mesh with the spur gear 16 on the gear member 14, and the gear 57 in mesh with the spur gear 47 which is secured to the lower bevel gear 43 of the differential. It will therefore be apparent that the lower bevel gear 43 of the differential will be rotated by the cam gear 14 and thereby through the connecting bevel gear 44 will subtract the value the $2aX$ imparted thereto from the value imparted to the upper bevel gear 42 by the pinion gear 34. The output of the bevel gear 42 of the differential 33 to the output shaft 20 and consequently the output of the output shaft 20 will therefore be $X^2 + a^2$.

As previously stated, due to manufacturing tolerances and wear during use, there is considerable back lash between the various pairs of meshing gears. Each time the direction of rotation of the gear member 14 is reversed by the input means this back lash creates lost motion between the gear member 14 and the output shaft 20 which produces an error in the output of the unit by the output shaft 20. Since the output of the unit is as the square of the input this error drastically increases as the value of X approaches zero. In order to eliminate the back last between meshing gears and thereby eliminate the lost motion caused thereby during reversing I rotatably mount a spur gear 23 upon the shaft 20 adjacent the lower plate 3 by anti-friction bearings 24 which are disposed in a sleeve 25 integral with and extending upwardly from the gear 23. A disk 26 having an integral collar 27 is pinned on the shaft 20 adjacent the upper end of the sleeve 25 as shown at 28. The gear 23 is connected to the shaft 20 through the disk 26 by a coil spring 29 which is disposed about the sleeve 25 and has one end thereof connected to the gear 23 and the other end thereof connected to the disk 26. The spring 29 is preloaded to yieldingly bias the shaft 20 in one direction. And I provide a second differential 60 and a gear train 61 by which the differential 60 is connected between the spiral gear 17 and the gear 23 on the output shaft 20.

The differential 60 is similar to the differential 33 and comprises a spider shaft 62 which is rotatably mounted between the plates 2 and 3, an upper bevel gear 63 which is rotatably mounted upon the spider shaft 62 and has a spur gear 64 secured thereto for rotation therewith; a lower bevel gear 65 which is rotatably mounted upon the spider shaft 62 in opposed spaced relation to the upper bevel gear 63 and has a spur gear 66, which meshes with the gear 23 on the output shaft 20, secured thereto for rotation therewith; and a connecting bevel gear 67 which meshes with the upper and lower bevel gears 63 and 65 and is rotatably mounted upon a spider 68 which is pinned to the spider shaft 62 between the gears 63 and 65.

The gear train 61 by which the differential 60 is connected between the spiral gear 17 and the gear 23 on the output shaft 20 is similar to the gear train 31, previously described, by which the differential 33 is connected between the spiral gear 17 and the gear 21 on the output shaft 20, and comprises a pinion gear 69 which is similar to the pinion 34. The pinion gear 69 meshes with the spiral gear 17 and is slidably splined on a radially extending shaft 70 for radial inward and outward movement in mesh with the spiral gear 17 as the gear member 14 is rotated in one direction or the other. The shaft 70, which is angularly offset from the shaft 35 a sufficient amount to provide clearance for the pinions 34 and 69 as they approach the inner end of the spiral gear 17, has the inner end thereof rotatably supported by the bearing post 6 and is rotatably supported adjacent the outer end thereof by a bearing bracket 71 similar to the bracket 36. A bevel gear 72 which is secured to the outer end of the shaft 70 meshes with a bevel gear 73 which is pinned on a shaft 74 which is rotatably mounted between the plates 2 and 3. The bevel gear 73 has a spur gear 75 secured thereto which meshes with a spur gear 76 pinned to the spider shaft 62 adjacent the gear 64 which is secured to the upper bevel gear 63 of the differential 60. From this it will be seen that the gear 23 on the output shaft 20 is driven by the gear member 14 through the spiral gear 17, pinion gear 69, shaft 70, the meshing bevel gears 72 and 73, the meshing spur gears 75 and 76 and the differential 60 through the spur gear 66 which is secured to the lower bevel gear 65 of the differential 60 and meshes with the gear 23.

The output of the pinion 69 is similar in all respects to the output of the pinion 34, and the equation for the output thereof to the differential 60 is $$(X_1 + a_1)^2 = X_1^2 + 2a_1X_1 + a_1^2$$

(see FIG. 8). The value $a_1^2$ being a constant can be disregarded, as is the case with the output of the pinion 34 to the differential 33, but the linear value $2a_1X_1$ must be subtracted from the output of the pinion 69 by the differential. For this purpose a rotatably mounted shaft 80 is interposed between the spur gear 16 of the gear member 14 and the differential 60. A pair of vertically spaced spur gears 81 and 82 are pinned on the shaft 80 with the gear 81 in mesh with the spur gear 16 of the gear member 14, and the gear 82 in mesh with the gear 64 which is secured to the upper bevel gear 63 of the differential 60. It will therefore be apparent that the upper bevel gear 63 is rotated by the gear member 14 and thereby through the connecting bevel gear 67 will subtract the value $2a_1X_1$ from the value imparted to the lower bevel gear 65 by the pinion gear 69. The output of the bevel gear 65 of differential 60 to the gear 23 will therefore be $X_1^2 + a_1^2$.

The gear ratios of the gears in the gear trains 31 and 61 are such that the gear 23 rotatably mounted on the output shaft 20 will be rotated by the spiral gear 17 through the gear train 61 and differential 60 at a slightly higher r.p.m. than gear 21 which will cause the pre-loaded spring 29 to unwind slightly as the value of X increases thereby progressively decreasing the pre-loading of the spring 29, and maintaining the driving torque constant.

Since the gears 21 and 23 are rotated from the same source through two similar gear trains, one of which connects the source to the gear 21 and the other of which connects the source to the gear 23, the pre-loaded spring 29, which connects the gear 23 to the shaft 20, will by its biasing effect upon the shaft 20 be operative to always maintain the same sides of the teeth of the various meshing gears in contact regardless of the direction of rotation of the gear member 14, and thereby eliminate all lost motion between the gear member 14 and the output shaft 20 when the direction of rotation of the gear member 14 is reversed.

Having explained the specific construction of a squaring unit having my invention incorporated therein the manner in which lost motion is eliminated thereby will not be described in connection with the diagrammatic views shown in FIGS. 10, 11 and 12. FIG. 10 diagrammatically illustrates the gear train 31 between the cam gear 14 and the final gear 21 pinned to the output shaft 20, the gear train 61 between the cam gear 14 and the final gear 23 rotatably mounted upon the output shaft 20 and connected thereto by the pre-loaded spring 29, and the relation of the gear trains 31 and 61 to each other. FIG. 11 is a detail view exaggeratedly showing the meshing of the teeth between the gears 46 and 21, and FIG. 12 is a view similar to FIG. 11 showing the meshing of the teeth between the gears 66 and 23, it being understood that the spring 29 is constructed, arranged and pre-loaded to yieldingly bias the output shaft 20, and consequently the gear 21 pinned thereto, in a counterclockwise direction and the gear 23 in a clockwise direction.

Assuming that a positive value is imparted to the squaring unit which will rotate the gear member 14 and spiral gear 17 thereon in a clockwise direction it will be seen by reference to FIGS. 10 to 12 that the final gear 21, of the gear train 31, and with it the output shaft 20 will be positively rotated by the gear train 31 in a clockwise direction with leading sides of the teeth of the various meshing pairs of gears of the gear train 31 in contact; and that the final gear 23 of the gear train 61 will also be rotated in a clockwise direction by means of the gear train 61 and pre-loaded spring 29 with the trailing sides of the teeth of the various pairs of meshing gears of the gear train 61 in contact. Assuming now that a negative value is imparted to the unit which will rotate the gear member 14 and spiral gear 17 in a counterclockwise direction it will be seen from FIGS. 10 to 12 that the final gear 21, of the gear train 31, and the output shaft 20 will be rotated in a counterclockwise direction by means of the gear train 31 and the pre-loaded spring 29 with the same sides of the teeth of the various pairs of gears of the gear train 31 in contact as was the case with a positive input value; and that the final gear 23 of the gear train 61 is positively rotated in a counterclockwise direction, and with it through the pre-loaded spring 29 the output shaft 20, with the same sides of the teeth of the various pairs of meshing gears of the gear train 61 in contact as was the case with a positive input value. The pre-loaded spring 29 by biasing the gear 21 in a counterclockwise direction and the gear 23 in a clockwise direction therefore is operative to always maintain the same sides of the teeth of the various pairs of meshing gears of both gear trains 31 and 61 in contact during both clockwise and counterclockwise rotation of the various gears of the two gear trains 31 and 61. Therefore there will be no shifting from one side of gear teeth to the other side thereof when the direction of rotation of the one gear member 14 is reversed as would be the case if the gear member 14 was connected directly to the output shaft 20 through a single gear train 31. Consequently all back lash and lost motion due to shifting back and forth between positive and negative input values is eliminated. With this construction the maximum torque that can be applied to the output shaft 20 by a negative input value is limited in accordance with the pre-loading of the spring 29, whereas a much greated torque may be applied to the output shaft 20 by a positive input value.

In order to prevent the pinion gears 34 and 69 from running off the spiral gear 17 at either end thereof and thereby damaging the mechanism, safety mechanism generally indicated by the numeral 85, by means of which the rotation of the gear member 14 is automatically stopped as the pinion gears 35 and 69 approach either end of the spiral gear 17 is provided. The safety mechanism 85 is double acting in that it mechanically stops the rotation of the gear member 14 and through a pair of micro-switches stops the operation of the input means by which the gear mechanism 14 is rotated. This safety mechanism 85 comprises a screw 86 which is rotatably mounted between the plates 2 and 3 and has a spur gear 87 secured to the upper end thereof through which the screw 86 is rotated in either direction by the annular gear 16 on the gear member 14 through a pair of spur gears 88 and 89 which are mounted on an idler shaft 90 with the gear 88 in mesh with the gear 16 and the gear 89 in mesh with the gear 87. An internally threaded cam block 91 is nonrotatably mounted upon the screw 86 for up and down movement thereon during rotation thereof. As the pinion gears 34 and 69 approach one end of the spiral gear 17 the cam block 91 will engage a stop 92 pinned to the screw 86 adjacent the lower end thereof, and as the pinions 34 and 69 approach the other end of the spiral gear 17 the cam block 91 will engage a stop 93 pinned to the screw 86 adjacent the upper end thereof. The engagement of the cam block 91 with either of stops 92 or 93 will prevent further rotation of the screw 86 in the current direction of rotation and thereby through the gears 87, 89, 88 and 16 stop further rotation of the gear member 14 and spiral gear 17 thereon. The cam block 91 is also operative to actuate a micro-switch 94 as it engages the stop 92, and a micro-switch 95 as it engages the stop 93; and the switches 94 and 95 are operative to stop the operation of the input mechanism and with it the rotation of the gear member 14 thereby.

From the foregoing it will be apparent to those skilled in this art that I have provided a relatively simple and efficient mechanism for accomplishing the objects of the invention.

It is to be understood that I am not limited to the specific construction shown and described herein as various modifications may be made therein within the spirit of the invention and the scope of the appended claims.

What is claimed is:

1. A squaring unit of the character described comprising a rotatably mounted input shaft through which an input value is imparted to said unit, a gear member comprising a flat disc secured to said input shaft for rotation therewith; said gear member having a spiral gear formed on the flat face thereof, and an annular gear formed in the periphery thereof; a rotatably mounted output shaft having a first gear secured thereon through which said output shaft is rotated, a differential disposed between said gear member and said output shaft, a pinion gear which is maintained in constant mesh with said spiral gear, a first gear train by which the output of said spiral gear is imparted through said pinion gear to said differential, a second gear train through which the output of said annular gear is imparted to said differential, safety mechanism which is operative to automatically stop the rotation of said gear member as said pinion gear approaches either end of said spiral gear, and a third gear train through which the output of said differential is imparted to said output shaft through the said gear secured thereon.

2. A squaring unit of the character described comprising a rotatably mounted input shaft through which an input value is imparted to said unit, a gear member comprising a flat disc secured to said input shaft for rotation therewith; said gear member having a spiral gear formed on the flat face thereof, and an annular gear formed in the periphery thereof; a rotatably mounted output shaft having a first gear secured thereon through which said output shaft is rotated, a differential disposed between said gear member and said output shaft, which comprises; a spider shaft and a pair of opposed bevel gears which are rotatably mounted on said spider shaft and are geared together by a connecting bevel gear which is rotatable on a spider secured to said spider shaft between said pair of opposed bevel gears; a pinion gear which is maintained in constant mesh with said spiral gear, gear means by which the output of said spiral gear is imparted through said pinion gear to said spider shaft, gear means by which the output of said annular gear is imparted to one bevel gear of said opposed pair of bevel gears, safety mechanism which is operative to automatically stop the rotation of said gear member as said pinion gear approaches either end of said spiral gear, and gear means connecting the other bevel gear of said pair of opposed bevel gears to said first gear.

3. A squaring unit of the character described comprising a gear member having a spiral gear formed on the flat face thereof and an annular gear formed in the periphery thereof, a rotatably mounted input shaft to which said gear member is secured for rotation thereby, a rotatably mounted output shaft, a first gear secured to said output shaft for rotation therewith, a second gear rotatably mounted on said output shaft, a first differential disposed between said gear member and said output shaft, a pinion gear which is maintained in constant mesh with said spiral gear, gear means by which the output of said spiral gear is imparted through said pinion gear to said differential, second gear means by which the output of said annular gear is imparted to said differential, safety mechanism which is operative to automatically stop the rotation of said gear member as said pinion gear approaches either end of said spiral gear, third gear means by which the output of said differential is imparted to said first gear, a second differential interposed between said gear member and said output shaft, a fourth gear means by which the output of said spiral gear is imparted to said second differential, a fifth gear means by which the output of said annular gear is imparted to said second differential, a sixth gear means by which the output of said second differential is imparted to said second gear, and a pre-loaded coil spring disposed about said output shaft with one end thereof connected to said output shaft and the other end thereof connected to said second gear, said pre-loaded spring being operative to yieldingly bias said first and second gears in opposite directions.

4. A squaring unit of the character described comprising a gear member having a spiral gear formed on the flat face thereof and an annular gear formed in the periphery thereof, a rotatably mounted input shaft to which said gear member is secured for rotation thereby, a rotatably mounted output shaft, a first gear secured to said output shaft for rotation therewith, a second gear rotatably mounted on said output shaft, a pair of differentials disposed between said gear member and said output shaft each of which comprises; a spider shaft and a pair of opposed bevel gears which are rotatably mounted upon said spider shaft and are geared together by a connecting bevel gear which is rotatably mounted on a spider secured to said spider shaft between said pair of opposed bevel gears; gear means including a pinion gear which is maintained in constant mesh with said spiral gear, and by which gear means the output of said spiral gear is imparted to each of the spider shafts of said pair of differentials, gear means by which the output of said annular gear is imparted to one bevel gear of each of said pair of opposed bevel gears of each of said differentials, safety mechanism which is operative to automatically stop the rotation of said gear member as said pinion gear approaches either end of said spiral gear, gear means connecting the other opposed bevel gear of one of said differentials to said first gear, gear means connecting the other opposed bevel gear of the other of said differentials to said second gear, and a preloaded coil spring disposed about said output shaft with one end thereof connected to said output shaft and the other end thereof connected to said second gear, said preloaded spring being operative to yieldingly bias said first and second gears in opposite directions.

5. A squaring unit as defined in claim 1 in which said safety mechanism comprises a rotatably mounted screw and means by which said screw is rotated in either direction by said annular gear, an internally threaded cam block non-rotatably mounted on said screw for back and forth movement thereon as said screw is rotated, a pair of fixed stops one of which is disposed adjacent each end of said screw in position to be engaged by said cam block as said cam block approaches either end of said screw to thereby stop the rotation of said gear member.

6. A squaring unit as defined in claim 5 in which a pair of switching means is provided which is adapted to be actuated by said cam block as said cam block approaches either end of said screw, said switching means being operative when actuated to stop the rotation of said input shaft.

7. A squaring unit as defined in claim 1 in which said safety mechanism comprises a rotatably mounted screw and means by which said screw is rotated in either direction by said annular gear, an internally threaded cam block non-rotatably mounted on said screw for back and forth movement thereon as said screw is rotated, and switching means which is adapted to be actuated by said cam block as said cam block approaches either end of said screw, said switching means being operative when actuated to stop rotation of said input shaft.

8. A squaring unit as defined in claim 2 in which said safety mechanism comprises a rotatably mounted screw and means by which said screw is rotated in either direction by said annular gear, an internally threaded cam block nonrotatably mounted on said screw for back and forth movement thereon as said screw is rotated, a pair of fixed stops one of which is disposed adjacent each end of said screw in position to be engaged by said cam block as said cam block approaches either end of said screw to thereby stop the rotation of said gear member.

9. A squaring unit as defined in claim 8 in which switching means is provided which is adapted to be actuated by said cam block as said cam block approaches either end of said screw, said switching means being operative when actuated to stop the rotation of said input shaft.

10. A squaring unit as defined in claim 2 in which said safety mechanism comprises a rotatably mounted screw and means by which said screw is rotated in either direction by said annular gear, an internally threaded cam block nonrotatably mounted on said screw for back and forth movement thereon as said screw is rotated, and switching means which is adapted to be actuated by said cam block as said cam block approaches either end of said screw, said switching means being operative when actuated to stop the rotation of said input shaft.

11. A squaring unit of the character described comprising a gear member having a spiral gear formed on the flat face thereof and an annular gear formed in the periphery thereof, a rotatably mounted input shaft to which said gear member is secured for rotation thereby, a rotatably mounted output shaft, a first gear secured to said output shaft for rotation therewith, a second gear rotatably mounted on said output shaft, a first differential disposed between said gear member and said output shaft, first gear means by which the output of said spiral gear is imparted to said differential, second gear means by which the output of said annular gear is imparted to said differential, third gear means by which the output of said differential is imparted to said first gear, a second differential interposed between said gear member and said output shaft, a fourth gear means by which the output of said spiral gear is imparted to said second differential, a fifth gear means by which the output of said annular gear is imparted to said second differential, a sixth gear means by which the output of said second differential is imparted to said second gear, and a pre-loaded coil spring disposed about said output shaft with one end thereof connected to said output shaft and the other end thereof connected to said second gear, said pre-loaded spring being operative to yieldingly bias said first and second gears in opposite directions, the gear ratios of said gear trains with respect to each other being such that said second gear is rotated at a slightly higher r.p.m. than said first gear, whereby said pre-loaded spring is caused to wind and unwind slightly during operation thereby maintaining the driving torque of the input shaft constant.

12. A squaring unit of the character described comprising a gear member having a spiral gear formed on the flat face thereof and an annular gear formed in the periphery thereof, a rotatably mounted input shaft to which said gear member is secured for rotation thereby, a rotatably mounted output shaft, a first gear secured to said output shaft for rotation therewith, a second gear rotatably mounted on said output shaft, a pair of differentials disposed between said gear member and said output shaft each of which comprises; a spider shaft and a pair of opposed bevel gears which are rotatably mounted upon said spider shaft and are geared together by a connecting bevel gear which is rotatably mounted on a spider secured to said spider shaft between said pair of opposed bevel gears; gear means by which the output of said spiral gear is imparted to each of the spider shafts of said pair of differentials, gear means by which the output of said annular gear is imparted to one bevel gear of each of said pair of opposed bevel gears of each of said differentials, gear means connecting the other opposed bevel gear of one of said differentials to said first gear, gear means connecting the other opposed bevel gear of the other of said differenitals to said second gear, and a pre-loaded coil spring disposed about said output shaft with one end thereof connected to said output shaft and the other end thereof connected to said second gear, said pre-loaded spring being operative to yieldingly bias said first and second gears in opposite directions, the gear ratios of said gear trains with respect to each other being such that said second gear is rotated at a slightly higher r.p.m. than said first gear, whereby said pre-loaded spring is caused to wind and unwind slightly during operation thereby maintaining the driving torque of the input shaft constant.

13. A squaring unit as defined in claim 3 in which said safety mechanism comprises a rotatably mounted screw and means by which said screw is rotated in either direction by said annular gear, an internally threaded cam block nonrotatably mounted on said screw for back and forth movement thereon as said screw is rotated, a pair of fixed stops one of which is disposed adjacent each end of said screw in position to be engaged by said cam block as the cam block approaches either end of said screw to thereby stop the rotation of said gear member.

14. A squaring unit as defined a claim 13 in which switching means is provided which is adapted to be actuated by said cam block as said cam block approaches either end of said screw, said switching means being operative when actuated to stop the rotation of said input shaft.

15. A squaring unit as defined in claim 3 in which said safety mechanism comprises a rotatably mounted screw and means by which said screw is rotated in either direction by said annular gear, an internally threaded cam block nonrotatably mounted on said screw for back and forth movement thereon as said screw is rotated, and switching means which is adapted to be actuated by said cam block as said cam block approaches either end of said screw, said switching means being operative when actuated to stop the rotation of said input shaft.

16. A squaring unit as defined in claim 4 in which said safety mechanism comprises a rotatably mounted screw and means by which said screw is rotated in either direction by said annular gear, an internally threaded cam block nonrotatably mounted on said screw for back and forth movement thereon as said screw is rotated, a pair of fixed stops one of which is disposed adjacent each end of said screw in position to be engaged by said cam block as said cam block approaches either end of said screw to thereby stop the rotation of said gear member.

17. A squaring unit as defined in claim 16 in which switching means is provided which is adapted to be actuated by said cam block as said cam block approaches either end of said screw, said switching means being operative when actuated to stop the rotation of said input shaft.

18. A squaring unit as defined in claim 4 in which said safety mechanism comprises a rotatably mounted screw and means by which said screw is rotated in either direction by said annular gear, an internally threaded cam block nonrotatably mounted on said screw for back and forth movement thereon as said screw is rotated, and switching means which is adapted to be actuated by said cam block as said cam block approaches either end of said screw, said switching means being operative when actuated to stop the rotation of said input shaft.

References Cited in the file of this patent

UNITED STATES PATENTS

| | | |
|---|---|---|
| 2,194,477 | Maxson et al. | Mar. 26, 1940 |
| 2,295,998 | Maxson et al. | Sept. 15, 1942 |

OTHER REFERENCES

Machine Design, February 1955, (pages 200–205 relied on). (Copy in Div. 12.)